United States Patent [19]
Chevalier et al.

[11] Patent Number: 5,222,587
[45] Date of Patent: Jun. 29, 1993

[54] DEVICE FOR MOVING PARTS FROM ONE STATION TO ANOTHER ALONG A LINE FOR PROCESSING THEM

[75] Inventors: Claude Chevalier, Villeneuve La Garenne; Michel Queau, Le Pecq; Didier Ardeley; Philippe Leuk, both of Verneuil sur Seine, all of France

[73] Assignee: Machines Assemblage Automatique, Cedex, France

[21] Appl. No.: 914,462

[22] Filed: Jul. 17, 1992

[30] Foreign Application Priority Data

Jul. 17, 1991 [FR] France .................. 91 09031

[51] Int. Cl.⁵ .................................................. B65G 37/00
[52] U.S. Cl. ........................... 198/465.1; 104/202; 104/233; 198/803.01
[58] Field of Search ............. 198/465.1, 465.2, 803.01; 104/173.1, 233, 234, 202, 232

[56] References Cited

U.S. PATENT DOCUMENTS

| | | |
|---|---|---|
| 1,355,860 | 10/1920 | Snesrud . |
| 2,740,515 | 4/1956 | Wilson . |
| 3,099,228 | 7/1963 | Lingg . |
| 3,312,330 | 4/1967 | Juengel . |
| 3,540,379 | 11/1970 | Pomagalski .................. 104/202 |
| 4,083,309 | 4/1978 | Gerard ........................ 104/173.1 |
| 4,151,905 | 5/1979 | Takahashi et al. ............. 104/233 |
| 4,513,854 | 4/1985 | Prodel et al. ................. 198/465.1 |
| 4,699,266 | 10/1987 | Weiss ............................ 104/234 |
| 4,724,951 | 2/1988 | Shinkawa et al. . |
| 4,974,519 | 12/1990 | Miletto ........................ 198/465.2 |

FOREIGN PATENT DOCUMENTS

| | | |
|---|---|---|
| 1253445 | 5/1989 | Canada ......................... 104/202 |
| 0161412 | 11/1985 | European Pat. Off. . |
| 0319674 | 6/1989 | European Pat. Off. . |
| 217982 | 1/1910 | Fed. Rep. of Germany . |
| 1267608 | 5/1968 | Fed. Rep. of Germany . |
| 2407847 | 4/1975 | Fed. Rep. of Germany . |
| 383379 | 3/1908 | France . |
| 1299874 | 3/1987 | U.S.S.R. ........................ 104/233 |

*Primary Examiner*—Joseph E. Valenza
*Attorney, Agent, or Firm*—Oblon, Spivak, McClelland, Maier & Neustadt

[57] ABSTRACT

Track (2) serves the stations of a line. A plurality of pallets (1) travel on track (2). The track and the pallets have guide elements (4, 54, 55) working with one another. The track is bordered by at least one marginal driving belt (7). The pallet (1) has on at least one of its sides an element for gripping the belt (7). The gripping element has at least one heavy element (8, 18, 20) resting by gravity on belt (7) so that a movement of this belt (7) relative to pallet (1) produces by friction a movement of this heavy element (8, 18, 20), triggering the engagement of the gripping element of pallet (1) with belt (7).

11 Claims, 5 Drawing Sheets

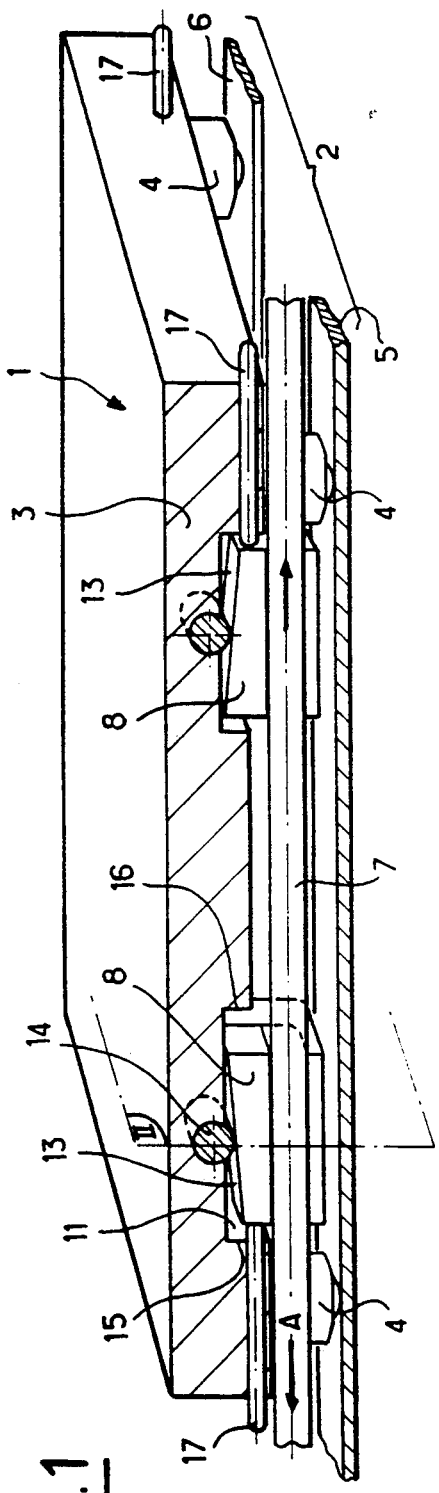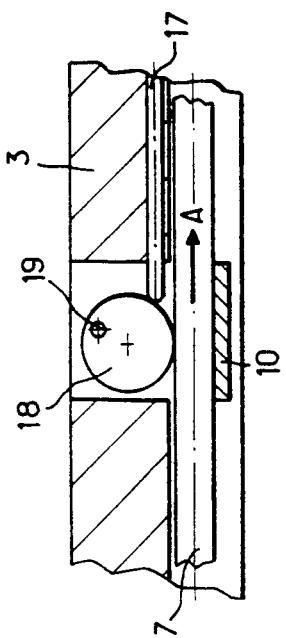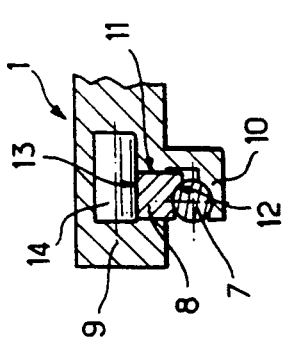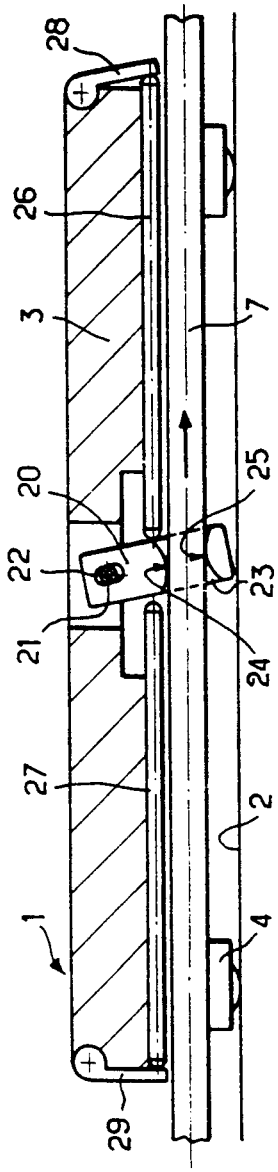

DEVICE FOR MOVING PARTS FROM ONE STATION TO ANOTHER ALONG A LINE FOR PROCESSING THEM

BACKGROUND OF THE INVENTION

1. Field of the Invention

This invention relates to the field of plane conveyors with adaptable geometry ordinarily called flexible shops, which are used to serve several stations for processing a part or an assembly. The stations can comprise, for example, stations for assembling components on a base or verification stations, these stations able to be automatic or manual, positioned between a station for supplying the line and a station for removal of the finished parts or units.

2. Description of the Related Art

This technique has already been used for several years. The equipment and machines used are of several types, which, however, all have the same basic idea: an assembly line (for example) comprising a main conveyor in the form of a closed loop on which bypasses are formed, which bypasses serve as one or more of the stations.

The bypasses can themselves constitute a loop on which secondary bypasses are attached. The main conveyor can direct each part directly to the bypass concerned, by short-circuiting those which are not concerned with the processing of the part involved. The main conveyor thus constitutes a recycling loop which manages the buffer stocks and the differences between the cycle times of each unit operation on the line.

The parts or the assemblies to be processed are most often placed on transport pallets which are moved and guided on a stationary track, in general made from standardized and modular elements, which makes possible adaptations of the shape of the track, either in the configuration of locations intended to receive the line, or in the development of requirements and of the number of stations installed along the line.

In many cases, the driving of pallets along the track is provided by one or two chains (roller type) or one or two belts which frictionally engage each pallet. The friction force is weak enough so that in the stopping and accumulation zones of the pallets, the movement of the chain or of the belt is not impeded.

The control of the driving force with this type of equipment is delicate. The load of the pallet and the resulting inertia considerably modify the quality of the link between pallet and driving run of the chains or belts used. Further, the passage of corners or curves requires the use of complex devices for guiding and picking up each pallet. Finally, the constant friction between the driving elements and the pallets is a source of rapid wear of the equipment which requires relatively high maintenance.

There therefore exists an unsatisfied requirement of a conveyor of pallets for a flexible shop, in which the pallet/driving element link is positive and can be easily disengaged, to have a well-controlled driving of the pallets and to reduce the wear of the active components of an installation.

SUMMARY OF THE INVENTION

For this purpose, the invention therefore has as an object a device for moving parts from one station to another along a line for processing these parts, comprising a track serving the stations of the line, a plurality of pallets traveling on the track, the track and the pallets having guide means working with one another, the track being bordered by at least one marginal driving belt, wherein the pallet comprises on at least one of its sides means for frictionally gripping the belt in response to movement of the belt relative to the pallet, the weight of the gripping means otherwise keeping it in a non-gripping position.

The device of the invention uses the friction between belt and pallet only to control the engagement therebetween. The friction is therefore a means of control, the transmission power is transmitted by the means of the engagement itself, so frictional wear is reduced.

In a first embodiment, the frictional gripping element includes a gripping element below which is a surface integral with the pallet on which the belt slides, the gripping element pressing the belt against the surface integral with the pallet.

The gripping element may consist of a heavy clamping pad resting on the belt by a lower surface and comprising, opposite this surface, a slope inclined downward in the direction of movement of the belt and sliding over a stationary stop of the pallet.

In a variant, the heavy element consists of a circular clamping cam jointed in an eccentric manner on the pallet around a pin transverse to the moving direction.

In order not to limit the use of a pallet according to the invention, the latter comprises, per side, two heavy elements placed in opposition to cause the engagement of the pallet to the belt in the two directions of movement of the latter.

In another preferred embodiment of the invention, the hitching element consists of a swinging lever jointed to the pallet above the belt with a play in the direction of the length of the lever, the latter comprising, opposite its joint, a groove for passage of the belt whose upper face rests on this belt and whose lower face forms a cam for locking the lever on the belt when the latter causes the pivoting of the lever by friction on the upper face.

To make possible the accumulation of pallets on the track without stopping the driving elements of the device, the latter comprises elements for disengaging the belt-pallet link, comprising a pusher engageable with each gripping element, mounted to slide in the pallet parallel to the direction of the belt and projecting beyond the front edge of the pallet in its direction of circulation when the gripping element grips the belt.

As a variant of the means for disengaging the belt-pallet link, for a gripping element in the form of a swinging lever, the groove for passage of the belt is delimited by the outside surface of two rollers mounted on the swinging lever so as to rotate with braking. During a stopping of the pallet, the belt pinched in the swinging lever drives the rotation of two rollers which undergo a driving torque greater than the braking torque.

Finally, also in a preferred embodiment of the invention, the pallet is approximately square and comprises a swinging lever in the center of each of its sides. The driving of the pallet can then pass equally from one side to the other of the pallet. The placing of the pallet on the track no longer has to be predirected.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein:

FIG. 1 is a partial diagrammatic view of a first embodiment of the device according to the invention;

FIG. 2 is a partial sectional view through plane II of FIG. 1;

FIG. 3 is a detail showing a first variant of the embodiment of FIG. 1;

FIG. 4 is a side view of a second variant of the embodiment of FIG. 1;

DETAILED DESCRIPTION OF THE PREFERRED EMBODIMENTS

Figure 7:
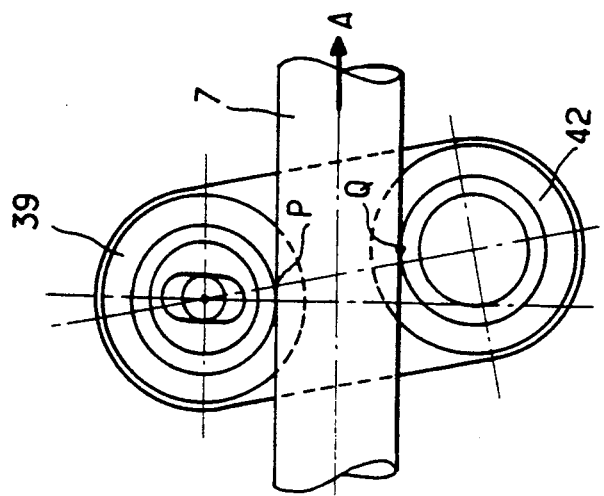
FIGS. 5, 6 and 7 are details illustrating another embodiment of the invention.

FIGS. 1 to 7 illustrate various mechanisms for the cooperation of a part-holder pallet 1 with a cylindrical driving belt. In these figures, pallet 1 is schematically shown as a plate 3 equipped with traveling elements 4 on a track 2 having two traveling paths 5 and 6. This track belongs to an infrastructure, not shown, which also comprises means for support and driving of belts along at least one side of the track. The track is thus bordered on one side or, for some sections, on both sides by a driving element i.e., a belt, with which each pallet can cooperate to be moved along the track which serves each of the processing stations to which the pallet is to be presented. In FIGS. 1 to 7, this belt is represented only by its active run 7.

The cooperation of pallet 1 with belt run 7 is achieved, in FIGS. 1 and 2, by a gripping element in the form of an engagement pad 8. Each side 9 of the pallet, as shown in FIG. 2 which is a section through plane II of FIG. 1, comprises a sole 10 on which belt run 7 rests. Plate 3 overhangs this sole and has, directly above belt run 7, a groove 11 in which pad 8 is mounted to slide. This pad rests by its own weight on run 7 and for this purpose has a lower surface 12 whose profile has an arc (FIG. 2).

Upper surface 18 of pad 8 is inclined. Groove or housing 11 has, opposite this surface 13, a cylindrical feeler gauge 14 on which surface 13 can bear according to its position in housing 11 between two stops 15 and 16. If, in FIG. 1, the belt run moves to the left, along arrow A, it drives pad 8 by friction in the same direction, which forms a wedge between feeler gauge 14 and run 7. Pallet 1 is then hitched to run 7 which drives it in a positive manner. This link is self-locking because the greater the force exerted by the belt on the pallet, the greater the force of pinching of run 7 between pad 8 and sole 10.

The unlocking or disengaging of this link can be performed in two ways. If the path of the pallet deviates from that of the belt, by the effect of guide means of this pallet integral with track 5, the belt can laterally escape the pinch. The second way of disengaging the link consists in moving wedge 8 back. This can be done by a pusher 17 embedded in pallet 1, when the pusher encounters a stationary stop on the track or a preceding pallet in an accumulation zone.

The pallet has two of the above arrangements at each side, so that it is able to cooperate with the belt whatever its direction of movement may be.

Instead of each of the pads of the preceding figures, the variant of FIG. 3 has a cam 18 consisting of a disk jointed in an eccentric manner to pallet 1. The effect of its weight keeps this disk in contact with belt run 7. The distance separating hinge pin 19 of this disk from belt run 7 is less than that separating this pin from the edge of the disk which is diametrically opposite the pin. Thus, when the belt is driven in direction 1, disk 18 tends to be engaged between run 7 and pin 19 and acts as a cam for pinching the run against sole 10. This cam therefore assures the linkage of the pallet to belt run 7 by wedging against the latter. To disengage this link, as in the embodiment described above, a pushing pin 17 embedded inside the pallet can push disk 18 backward.

The peripheral profile of disk 18 will advantageously be of the same shape as that of the pads described above to make possible a lateral escape of the belt run during a divergence between the paths of the belt and the pallet.

FIG. 4 is the illustration of another variant of coupling means provided between the pallet and the belt driving run. Some of the elements already described for the above figures bear the same references. Here, the pallet is equipped in the center of each of its sides with a swinging lever 20 jointed to the pallet by a stationary pin 21 housed in an elongated hole 22 of lever 20. At the end of the lever opposite hole 22, the latter has a groove 23 which is open laterally and delimited by two convex surfaces, upper surface 24 and lower surface 25, whose minimum spacing is slightly greater than the diameter of belt run 7. At rest, with the belt stopped and housed in groove 23, the swinging lever rests on run 7 by upper surface 24 of groove 23, pin 21 being housed in the lower end of hole 22. The movement of the belt in direction A tends to make lever 20 pivot toward the right of FIG. 4 around pin 21. Surface 25 then grips belt 7. There then occurs a linkage between lever 20 and belt run 7 which increases as the force exerted by the belt on the pallet increases.

In the same way as above, the disengagement of this link is performed either by lateral escape of run 7 leaving groove 23 of the lever or by action of the pushing pins 26, 27 which are actuated from the front of the pallet in the direction of its movement, and which move the lever to a vertical position.

It is necessary to note in this embodiment that a single swinging lever is suitable for the driving of the pallet in two opposite directions. Flaps 28, 29, jointed on the front edges of the pallet, offer an outside surface extended over the entire front width of the pallet to receive a thrust force and transmit it to the corresponding pushing pin.

Figure 6:
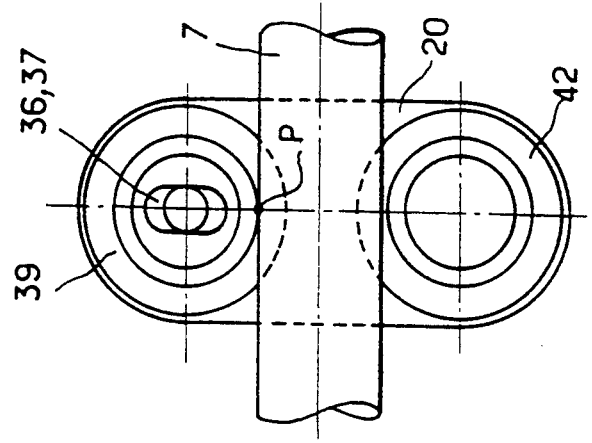
Figure 5:
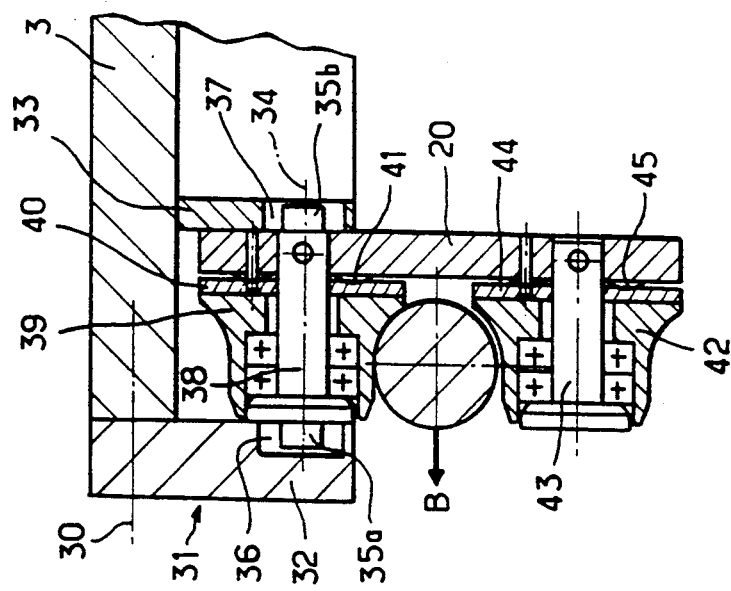

A final variant of the pallet-belt coupling means is illustrated by FIGS. 5, 6 and 7. Means similar to those of FIG. 4, i.e., comprising a swinging lever 20, are involved. Plate 3 receives, by bolts 30, a housing 31 which forms, by its walls 32 and 33, a joint yoke for lever 20. Hinge axis 34 has pivot pins 35a and 35b which are housed in holes 36 and 37 of the yoke so that lever 20 has, besides the possibility of oscillating in the yoke, a freedom in vertical translation. Pivot pins 35a and 35b form the ends of a pin 38, integral with lever 20 and on which a roller 39 is mounted to rotate. A friction fitting 40 is placed between roller 39 and lever 20. A spring blade 41 presses this fitting 40, which is rotationally fixed on lever 20, against the side of the roller, and consequently a continuous resistant torque is applied to the roller. The roller therefore can rotate only if it undergoes a driving torque overcoming this resistant torque. A second roller 42 is mounted in the same way at the free end of swinging lever 20 (on a pin 43 with friction fitting 44 and spring 45), the distance separating the two rollers being slightly greater than the diameter of belt run 7 which is housed between them. The profiles of the outside surfaces of rollers 39 and 42 are such that they do not oppose the lateral escape of the belt (direction B in FIG. 5).

FIGS. 6 and 7 are front views of lever 20. In FIG. 6, belt 7 is immobile and lever 20 rests on the belt by lower point P of roller 39. When the belt is driven in movement A, the friction of run 7 on roller 39 makes lever 20 rotate as in the case of FIG. 4. Lower roller 42 is then brought into contact with the belt run at point Q and the pallet is engaged with the belt. If the pallet is immobilized, the force of the belt on the rollers overcomes the friction torque applied by fittings 40 and 44, and the rollers 39 and 42 can rotate around their respective axis as long as the pallet is kept immobile.

The braking torque of the rollers on the lever can instead be exerted by a magnetic field pressing the fittings on the rollers.

Figure 8:
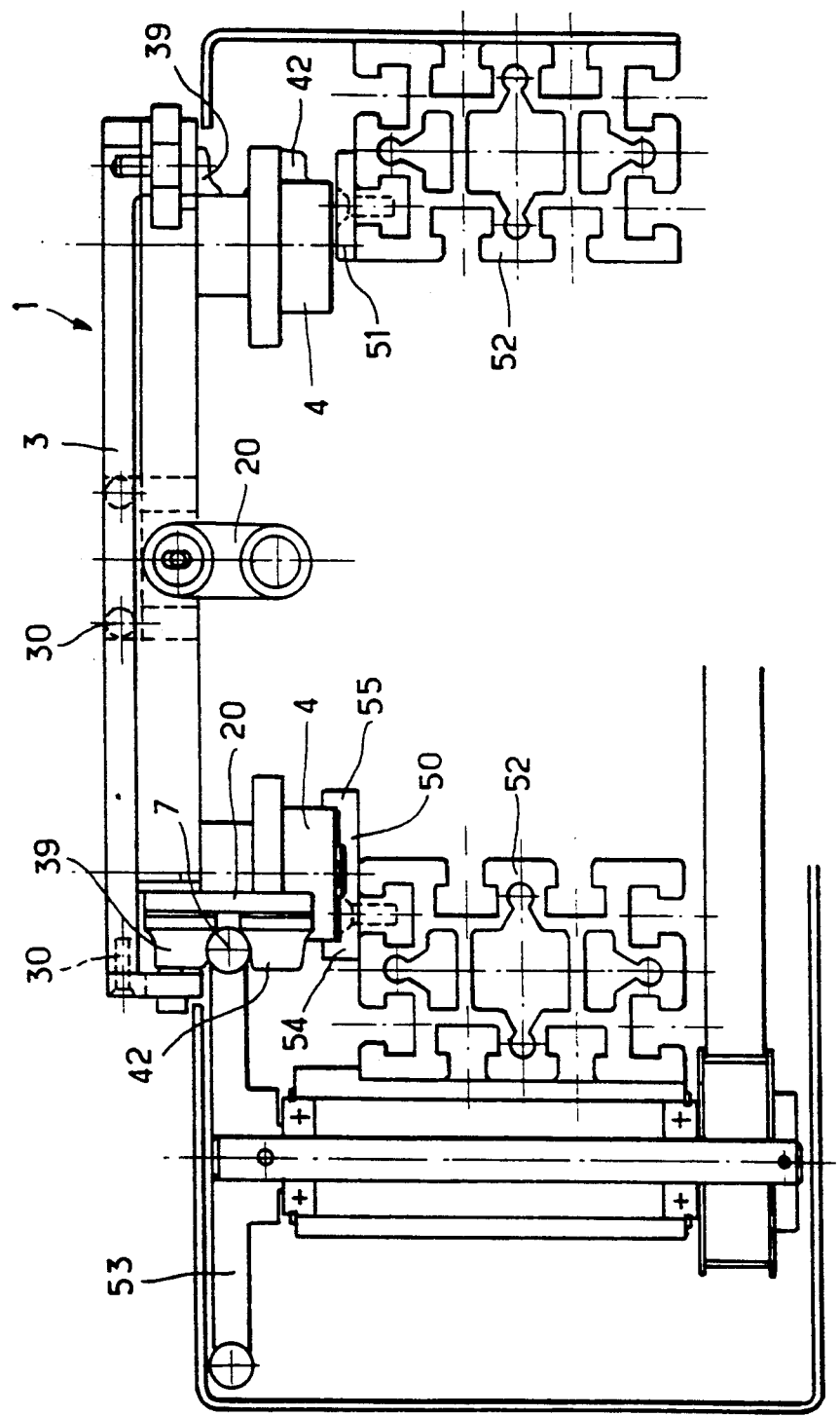
FIGS. 8 and 9 are elevation and plan views of a further embodiment of the device.
Figure 9:
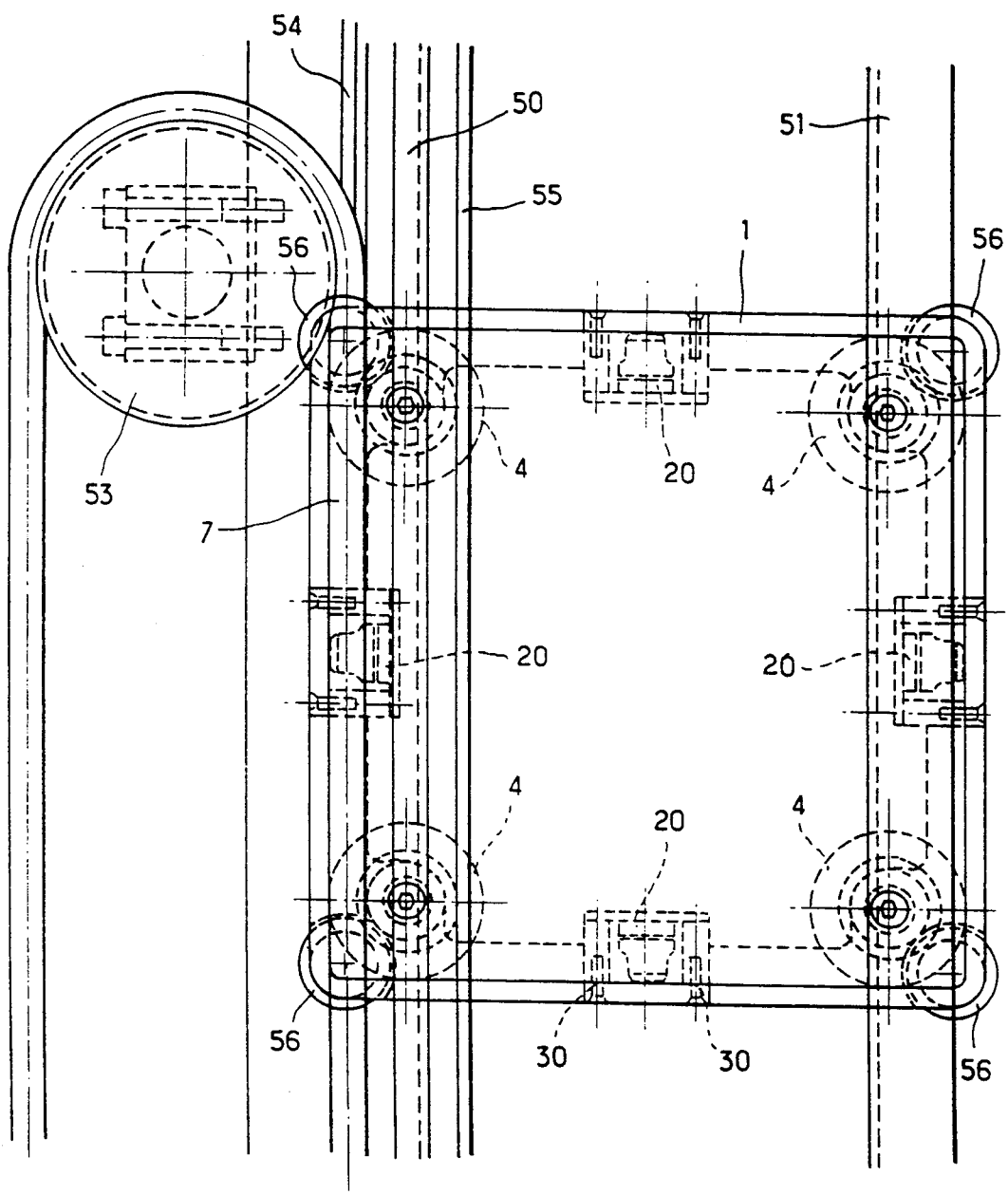
Figure 10:
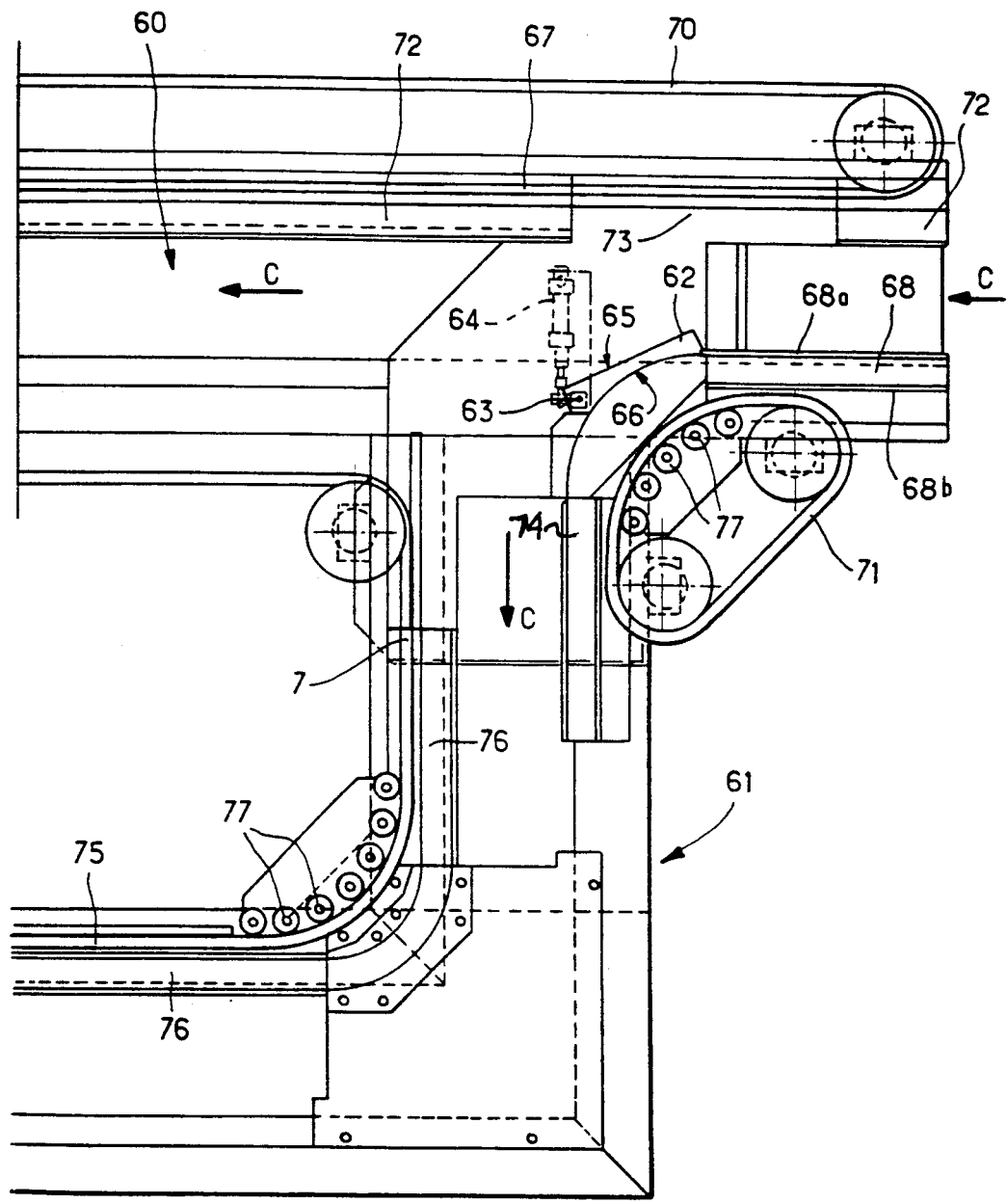
FIG. 10 is a plan view of a shunting and bypass zone of the device.

FIGS. 8, 9 and 10 illustrate by partial views the device as a whole, i.e., the pallet placed on a stationary structure supporting the traveling track of the pallet, the stationary elements for guiding the latter and the belt supports and their driving motors.

In FIGS. 8 and 9, which are respectively a crosswise partial section of the device and a partial top view, it is seen that traveling paths 50, 51 of pallet 1 are carried by shaped beams 52 which are themselves integral with underframes, not shown, and braced to constitute (in a modular manner or not) a frame. Beams 52 also form the support for return pulleys 53 of endless belts which have their driving run 7 in the vicinity of that of traveling paths 50 or 51, which is bordered by a unilateral guide rail of the pallet. This rail consists of raised edges 54, 55 of path 50, which frame the supports of traveling elements 4.

To permit a lateral traveling of the pallet, the guide rail can be replaced by two opposite guides each having a single raised edge.

Pallets 1 comprise, in each of their corners, a roller 56 with a vertical axis which projects beyond the sides of the corner and which is made of a shock-absorbing material such as an elastomer.

In FIG. 10, a part of the device of the invention which comprises a branching between a main circulation path referenced 60 and a bypass path 61 has been shown, the direction of circulation of the pallets being designated C.

A pallet approaching this branching from the right side of the figure is first picked up by run 67 of belt 70 and directed in path 60 or path 61 according to the position of a direction shunt 62. This shunt is pivoted at 63 by one of its ends around a vertical pin perpendicular to the track and is turned around this axis by a cylinder 64. It has a straight side 65 and a curved side 66. In its position of the figure, curved side 66 is active and forms the continuity of raised edge 68a of rail 68. A belt 71 is located inside the curve which defines edge 66 of shunt 62.

The pallet, driven by belt run 67, also cooperates with its lateral side opposite to that close to run 67 with belt 71. Traveling elements 4 located on this same side are then forced to follow curve 66 while guide rail 72 close to run 67 has a break 73 to allow the guide elements to escape from the pallet with which it cooperates.

At the same time, the lever for engaging the pallet with the belt escapes the latter. The pallet is therefore carried in path 61 in the direction of rail 74, then is picked up by a belt 75 and a rail 76 which guides it all along path 61 both in its curved parts and in its straight parts.

In case it is desired to direct the pallet in path 60, shunt 62 is brought back by cylinder 64 in the direction of belt 71 so that its straight side 65 extends raised edge 68b of rail 68. The pallet then remains engaged with run 67 even if by its opposite lateral edge it cooperates for a brief moment with belt 71. Rail 68 extended by edge 65 of the shunt guides the pallet during its passage from zone 73 without a rail on the side of belt run 67. The pallet then continues in path 60 guided by rail 72.

If, on the other hand, the pallets circulate in a direction opposite that indicated in C, shunt 62 will be a free shunt without cylinder 64. A pallet reaching path 61 picked up by belt 71 will push back shunt 62 into its represented position (if it was not there already). A pallet arriving on path 60 will push back free shunt 62 by resting on its straight side 65 and will be able to continue its path in the direction of the straight line of the figure.

It will have been noted in this FIG. 10 that the active belt runs are, in the curves, located radially inside the latter and deflected by a plurality of consecutive rollers 77 placed along a curve which is not an arc, to correspond to the noncircular path of levers 20 for, hitching each pallet to the belts. Actually, it is simpler to provide circular curved rails which, traveled through by elements 4 framing levers 22, determine the noncircular geometry of the path of these levers.

Obviously, numerous modifications and variations of the present invention are possible in light of the above teachings. It is therefore to be understood that within the scope of the appended claims, the invention may be practiced otherwise than as specifically described herein.

What is claimed as new and desired to be secured by Letters Patent of the United States is:

1. A device for moving parts from one station to another, comprising:
   a track about which stations are arranged, said track comprising guide means and at least one driving belt; and
   a plurality of pallets travelling on said track, each of said pallets comprising:
   a) guide means for guiding the pallet on the track, and
   b) belt gripping means including a gripping element which grips the belt in response to movement of the belt, and whose weight causes the gripping element to assume a non-gripping position when the belt is not moving.

2. The device of claim 1 wherein said belt gripping means comprises a lever pivoted to said pallet at a position above said belt, said lever forming a groove into which said belt fits, whereby movement of the belt pivots the lever so as to grip the belt.

3. The device of claim 1 including means mounted on the pallet for releasing the belt gripping means from the belt, said releasing means comprising a pusher engageable with the belt gripping means and projecting outside of the pallet.

4. The device of claim 3 including a flap mounted to the pallet and engageable with said pusher for pressing the pusher into engagement with said belt gripping means.

5. The device of claim 2 wherein said groove is comprised between two rollers mounted to said lever.

6. The device of claim 2 wherein said pallet guide means comprises guide pins and said rail track guide means comprise a rail with which the guide pins cooperate, wherein said lever is positioned between the guide pins.

7. The device of claim 6 wherein said track has curves and wherein said belt is located at a radially inner side of each curve of the track.

8. The device of claim 2 wherein said pallet is square as seen in plan, and where one of said levers is positioned at a center of each side of the square.

9. The device of claim 8 including shock absorbers at each corner of the square.

10. The device of claim 5 including roller braking means.

11. The device of claim 1 wherein said gripping element is so as to permit the belt to laterally escape from said gripping means.

* * * * *